Patented Oct. 27, 1936

2,058,881

UNITED STATES PATENT OFFICE 2,058,881

TREATMENT OF INHIBITORS

Vladimir Ipatieff, Chicago, Ill., assignor to Universal Oil Products Company, Chicago, Ill., a corporation of Delaware No Drawing. Application March 30, 1933, Serial No. 663,549

2 Claims. (Cl. 44—9)

This invention relates more particularly to the treatment of antioxidants used in small quantities to retard the deterioration in properties of hydrocarbon motor fuels subject to change on storage.

More specifically the invention refers to a process for increasing the inhibiting power of certain semi-refined products which are used as inhibitors for hydrocarbon motor fuels, more particularly wood tars and selected fractions thereof which are the subject of United States Patents Nos. 1,889,835 and 1,889,836 patented Dec. 6, 1932.

In one specific embodiment the present invention comprises the treatment of wood tar fractions with olefins in the presence of phosphoric acid.

In treating wood tar fractions according to the process of the present invention the commoner acids of phosphorus such as the well known ortho phosphoric acid and ortho phosphorous acid are generally preferable on account of their ready availability and moderate cost although it is also comprised within the scope of the invention to employ any of the acids of phosphorus alone or in admixture insofar as beneficial and economical results are obtainable thereby. These alternative reagents are not proposed as exact equivalents since to any one sufficiently conversant with the chemical art it is obvious that each will exert its own particular effect in any given case. In the table below a tabulation of the names, formulas and common properties of the acids of phosphorus is appended.

ing withdrawn from the bottom of the tower and separated as before.

The exact character of the reactions which take place when wood tar fractions are treated with olefins in the presence of phosphorous acid (or other acids of phosphorus) is not definitely known and it is further doubtful whether they could ever be positively evaluated on account of the complex composition of wood tars which have occasioned a great deal of dispute among researchers in this field. Furthermore, since treatments may be effected using mixtures of olefins such as those occurring in cracked gases, the number and character of the reactions is still further complicated so that no attempt will be made to trace their exact course, reliance being placed upon observed experimental data.

When conditions are properly regulated it has been found to be an invariable rule that the inhibiting value of wood tar fractions is substantially increased by the use of the process of the present invention. The fractions may undergo further refining due to the polymerization of heavy pitchy materials which can be left behind as residuum in subsequent distillation so that the fraction finally recovered is better from an inhibitor standpoint in preventing loss in color and antiknock value and increase in gums and also better due to the fact that the color of the gasoline is initially affected less by the addition of the necessary quantities of material.

As a particular example of results obtained in treating wood tar fractions, the following case Table

|  |  |  | M. P.° C. | Dec.° C. |
|---|---|---|---|---|
| Hypophosphorous | $H_3PO_2$ |  | 26.5 | Above M. P. |
| Ortho phosphorous | $H_3PO_3$ | $P_2O_3.3H_2O$ | 70.0 | 200. |
| Pyro phosphorous | $H_4P_2O_5$ | $P_2O_3.2H_2O$ | 38.0 | 130. |
| Hypophosphoric | $H_4P_2O_6$ | $P_2O_4.2H_2O$ | 55.0 | 70. |
| Metaphosphoric | $HPO_3$ | $P_2O_5.H_2O$ | Sublimes |  |
| Pyro phosphoric | $H_4P_2O_7$ | $P_2O_5.2H_2O$ | 61 |  |
| Ortho phosphoric | $H_3PO_4$ | $P_2O_5.3H_2O$ | 38.6 | Loses ½ $H_2O$ at 213. |

In treating wood tar according to the process of the present invention an effective method of contacting which may be applied to continuous operation consists in forcibly injecting olefin vapors, acid catalyst and wood tar into mixing devices positioned inside the top of filled columns, the emulsion produced being allowed to trickle downwardly over the filling material to complete the initiated reactions, all reaction products being may be cited although it is merely representative.

A hardwood fraction boiling within the approximate range of 240 to 280° C. was used as an inhibitor in a gasoline obtained by the intensive cracking of Pennsylvania gas oil, the induction period of the gasoline in the oxygen-bomb being raised from 45 to 500 minutes by the addition of 0.05% of the wood tar fractions by weight of the gasoline. The effect of this addition upon the color of the gasoline was to cause it to drop from +30 to approximately 26 on the Saybolt color scale.

A similar wood tar fraction was treated with the fixed gases from the process which produced the gasoline, the tar fraction being thoroughly agitated with approximately 10% by weight of 90% phosphoric acid while the gas mixture was bubbled therethrough. The wood tar fraction gained approximately 15% in weight and, after separation of the acid and redistillation under vacuum, to leave behind pitchy polymers, its value was found to be considerably enhanced as shown by the fact that only 0.03% was required to be added to the same gasoline to raise the induction period to 550 minutes while the color of the gasoline on the Saybolt scale was substantially unaffected.

The nature of the invention is clear from the foregoing specification and the supporting data showing results obtainable by its use but neither is to be construed in a narrow sense as imposing undue limitations upon its generally broad scope.

I claim as my invention:

1. A process for inhibiting gum formation in cracked gasoline which comprises adding to the gasoline, as a permanent ingredient thereof, a small amount of the reaction product of an olefin with a wood tar distillate boiling between 240° C. and 280° C., said product having higher inhibiting value than the unreacted wood tar distillate.

2. Motor fuel comprising cracked gasoline containing, as an inhibitor, a small amount of the reaction product of an olefin upon a wood tar distillate boiling between 240° C. and 280° C., said product having higher inhibiting value than the unreacted wood tar distillate.

VLADIMIR IPATIEFF.